United States Patent
Hsu

(10) Patent No.: US 10,246,859 B1
(45) Date of Patent: Apr. 2, 2019

(54) HAND CLEANING SYSTEM

(71) Applicant: HOKWANG INDUSTRIES CO., LTD., New Taipei (TW)

(72) Inventor: Chi-Chin Hsu, New Taipei (TW)

(73) Assignee: HOKWANG INDUSTRIES CO., LTD., New Taipei (TW)

( * ) Notice: Subject to any disclaimer, the term of this patent is extended or adjusted under 35 U.S.C. 154(b) by 0 days.

(21) Appl. No.: 15/894,114

(22) Filed: Feb. 12, 2018

(51) Int. Cl.
*A47K 5/12* (2006.01)
*E03C 1/05* (2006.01)
*E03C 1/14* (2006.01)
*G06K 7/10* (2006.01)
*A47K 10/48* (2006.01)

(52) U.S. Cl.
CPC ............ *E03C 1/057* (2013.01); *A47K 5/1217* (2013.01); *A47K 10/48* (2013.01); *E03C 1/14* (2013.01); *G06K 7/10425* (2013.01); *A47K 2210/00* (2013.01)

(58) Field of Classification Search
CPC ......... E03C 1/057; E03C 1/14; A47K 5/1217; A47K 10/48; G06K 7/10425
USPC .......................................................... 4/628
See application file for complete search history.

(56) References Cited

U.S. PATENT DOCUMENTS

| | | | | |
|---|---|---|---|---|
| 6,236,953 B1 * | 5/2001 | Segal | ...................... | G07C 1/10 702/127 |
| 9,715,817 B2 * | 7/2017 | Wildman | ............ | G06F 19/3418 |
| 2010/0134296 A1 * | 6/2010 | Hwang | ................ | A47K 5/1217 340/573.1 |

FOREIGN PATENT DOCUMENTS

CN 104970722 A 10/2015

OTHER PUBLICATIONS

Show Guide, 2017 Taipei Building Show, (https://www.taipeibex.com/tw/2017/en_US/index.php), Dec. 14-17, 2017, 16 pages, Taipei, Taiwan.

* cited by examiner

*Primary Examiner* — Tuan N Nguyen
(74) *Attorney, Agent, or Firm* — Muncy, Geissler, Olds & Lowe, P.C.

(57) ABSTRACT

A hand cleaning system includes four cleaning devices, a sensing device and a control device. Cleaning services respectively provided by the four cleaning devices are different. The control device controls each of the cleaning devices and the sensing device. The control device is set with procedure control data, which causes the control device to sequentially activate the cleaning devices when read. The control device has a first operation mode in which each of the cleaning devices can be independently activated, and a second operation mode in which the procedure control data is read upon acquiring a procedure activation signal to temporarily control the cleaning devices to operate. The control device in the second operation mode determines whether a usage time of each of the cleaning devices satisfies a minimum usage time condition to accordingly demand a user to properly perform hand cleaning.

9 Claims, 5 Drawing Sheets

HAND CLEANING SYSTEM

FIELD OF THE INVENTION

The present invention relates to a hand cleaning system, and particularly to a hand cleaning system with hand washing management and energy consumption management.

BACKGROUND OF THE INVENTION

In hospitals or food processing plants, hand cleaning systems are generally provided to prevent bacteria caused by hand filth from affecting implementation processes or products, and operating staff are required to perform certain hand cleaning procedures on their hands. Associated patented techniques are as disclosed by the U.S. Pat. No. 9,715,817 and the China Patent No. 104970722A.

In the U.S. Pat. No. 9,715,817, a user is required to undergo identity verification and actual usage conditions of a user are recorded. As such, although whether a user properly performs a cleaning process can be learned based on the records, the user can only be orally advised if it is discovered from the records that the user has not properly performed such cleaning process. Further, specifically regulating that the user must conduct the cleaning process still cannot be achieved, and whether the user properly performs the specified cleaning process remains uncertain. In the China Patent No. 104970722A, multiple cleaning devices are provided on a same apparatus, and whether a user properly completes a cleaning process and whether all cleaning processes have been performed are not determined, leading to a compromise in an intended goal of the apparatus.

Moreover, the above patented techniques do not propose any energy consumption management for a hand cleaning system, easily resulting in an issue of wasted resources.

SUMMARY OF THE INVENTION

It is a primary object of the present invention to solve issues of being incapable of demanding a user to properly complete a hand washing procedure and energy management of the prior art.

To achieve the above object, the present invention provides a hand cleaning system including four cleaning devices, a sensing device and a control device. Each of the cleaning devices includes a detection element, which generates an activation signal after being operated. Each of the cleaning devices is activated in response to the activation signal and provides a cleaning service. The cleaning services respectively provided by the cleaning devices are different. The four cleaning devices are sequentially a soap dispenser, a water faucet, a hand dryer and a disinfectant liquid dispenser. The sensing device generates a procedure activation signal when an identification tag approaches. The control device is connected individually to each of the cleaning devices and the sensing device, and is set with procedure control data. After the procedure control data is read, the control device sequentially controls each of the cleaning devices, and outputs a simulated activation signal to each of the cleaning devices through operating time data. The operating time data is set according to the corresponding cleaning service. The procedure control data further has a minimum usage time condition defined on the basis of the operating time data. The control device has a first operation mode in which the control device can cause each of the cleaning devices to be independently activated, and a second operation mode in which the control device, upon acquiring the procedure activation signal, reads the procedure control data and temporarily controls the cleaning devices to operate. In the second operation mode, the control device receives the activation signal generated by each of the detection units, and compares a generation time of the activation signal according to the minimum usage time condition. If the generation time of the activation signal does not satisfy the minimum usage time condition, the control device re-activates the cleaning device.

In one embodiment, the procedure control data includes at least one set of waiting time data subsequent to the operating time data, and each of the cleaning devices is not activated in a time interval defined by the waiting time data.

In one embodiment, the procedure control data includes at least one set of prompt time data configured before each set of operating time data. The control device requests, according to the prompt time data, the cleaning device to be activated to perform an operation prompt. Further, the operation prompt is emitting light by a light emitting of the cleaning device.

In one embodiment, the control device, in the second operation mode, times the generation time of the activation signal to generate usage time data. The control device generates estimated energy consumption data completed based on the operating time data, and actual energy consumption data completed based on the usage time data.

In one embodiment, the hand cleaning system includes a wash basin countertop for disposing the cleaning devices and the control device. A wash basin facing a supply port of each of the cleaning devices is forming on the wash basin countertop.

In one embodiment, the control device generates user data completed based on the identification tag and the usage time data.

In one embodiment, the hand washing system further includes a server database informationally connected with the control device.

In one embodiment, the hand washing system further includes a display device connected with the control device, and the control device outputs a plurality of sets of image data to the display device when the control device reads the procedure control data to cause the display device to perform display based on each of the sets of image data.

With the above disclosure, the present invention provides following features compared to the prior art. In the present invention, the hand cleaning system specifically demands a user to complete a cleaning operation of a certain level to prevent the issue of improper cleaning caused by personal reasons. Further, the hand cleaning system allows a manager to perform adjustment according to the estimated energy consumption data and the actual energy consumption data to ensure that no resources are wasted.

DETAILED DESCRIPTION OF THE PREFERRED EMBODIMENTS

Details and technical content of the present invention are given with the accompanying drawings below.

Figure 1:
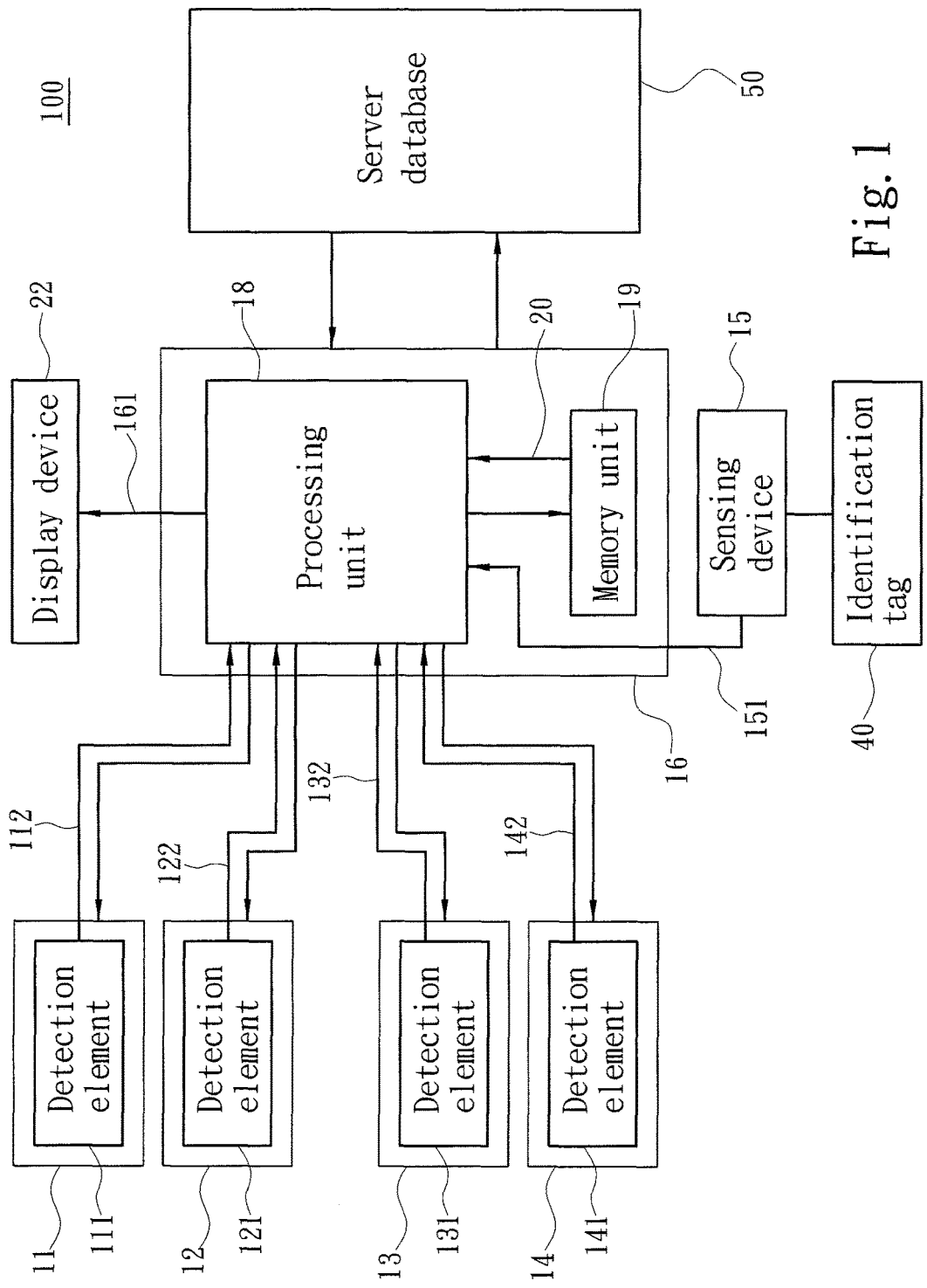
FIG. 1 is a schematic diagram of constituting units according to an embodiment of the present invention.
Figure 2:
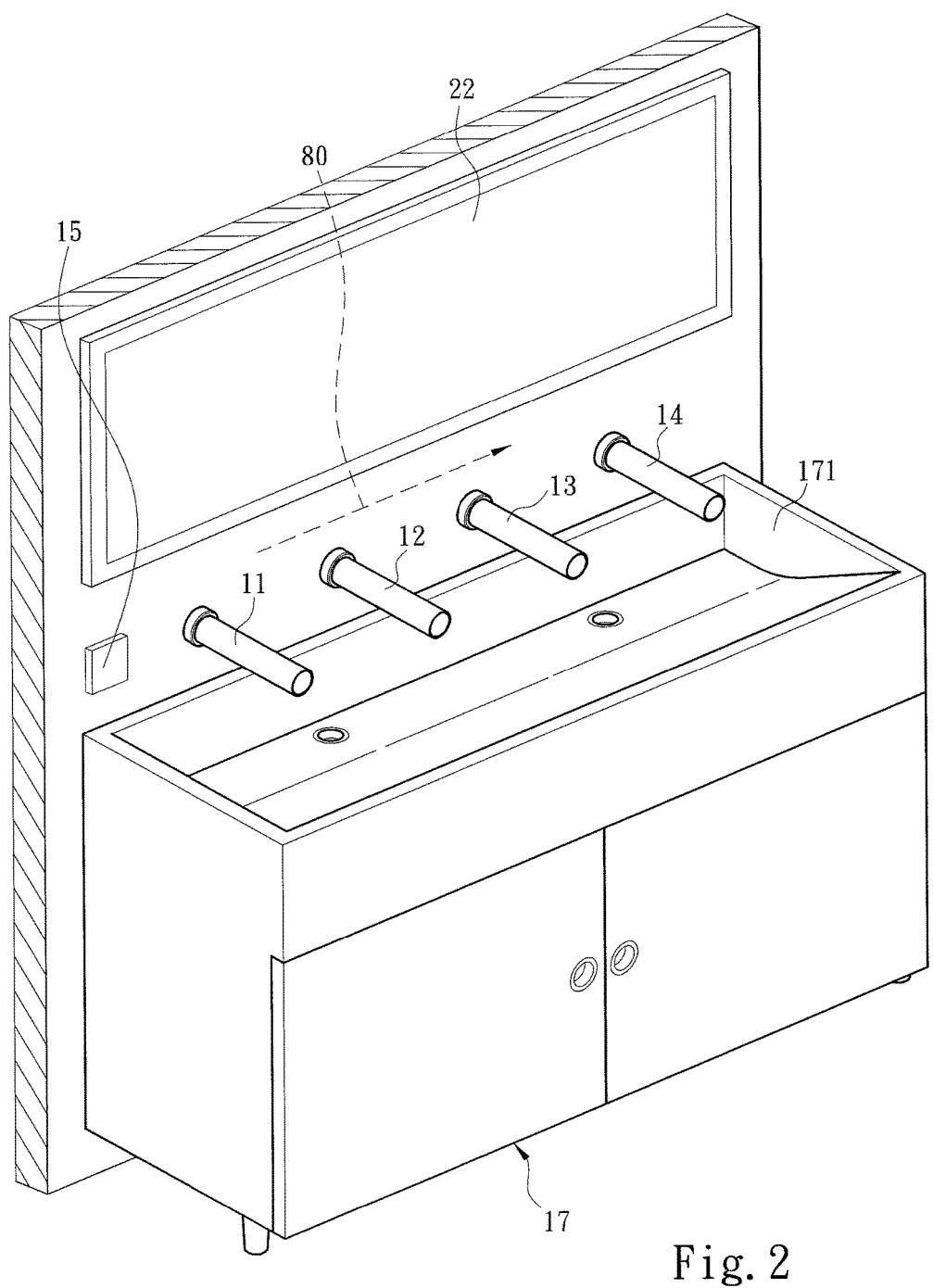
FIG. 2 is a schematic diagram of a structure according to an embodiment of the present invention.
Figure 3:
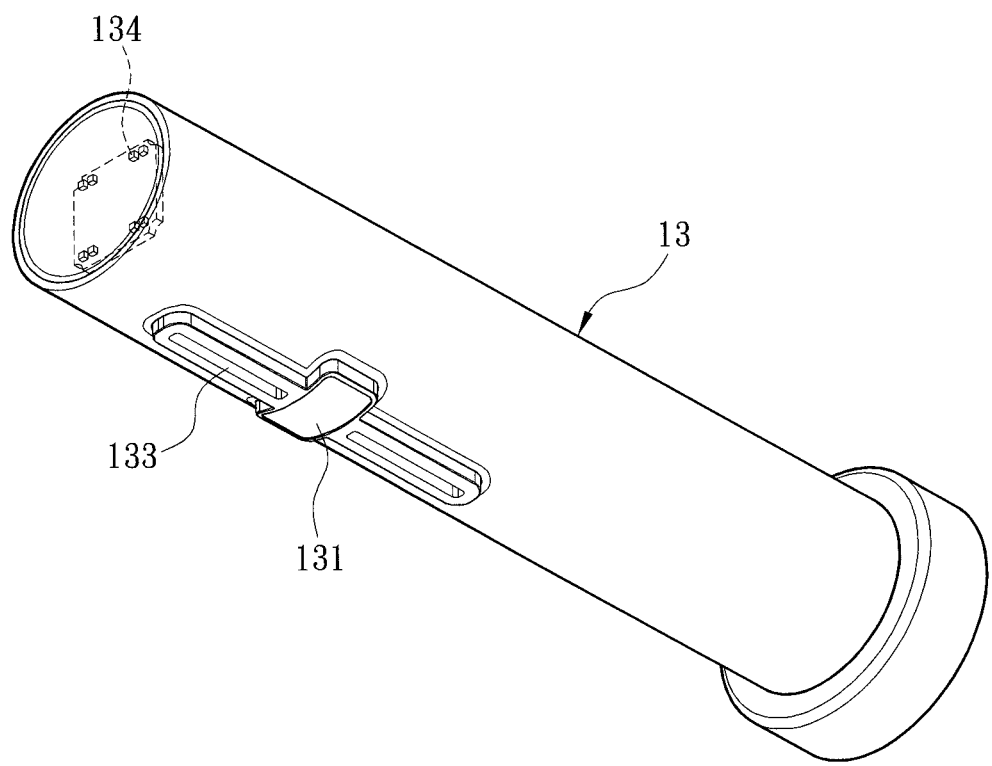
FIG. 3 is a schematic diagram of a structure of a cleaning device according to an embodiment of the present invention.

Referring to FIG. 1, FIG. 2 and FIG. 3, the present invention provides a hand cleaning system 100, which may be set up at a facility needing to ensure hand cleanliness, e.g., a plant, a surgery room and a nursery. The hand cleaning system 100 includes four cleaning devices (11, 12, 13, 14), a sensing device 15 and a control device 16. Each cleaning device 11 (12, 13, 14) provides a cleaning service after having been activated. The cleaning service may be one of liquid soap dispensing, water dispensing, disinfectant liquid dispensing and hand-drying gas provision, and the cleaning services respectively provided by the cleaning devices (11, 12, 13, 14) are different. Further, the four cleaning devices (11, 12, 13, 14) of the present invention are sequentially a soap dispenser, a water faucet, a hand dryer, and a disinfectant liquid dispenser, with the sequence shown as indicated by an arrow 80 in FIG. 2. Referring to FIG. 3, each cleaning device 13 includes a detection element 131, which may be an infrared sensor or other elements capable of sensing an approaching object. The detection element 131 generates an activated signal 132 after being operated. The term "operated" refers to a user approaching close to the detection element 131. When the detection element 131 generates the activation signal 132, each cleaning device 13 becomes activated to provide the cleaning service. Again referring to FIG. 2, in one embodiment, the hand cleaning system 100 includes a wash basin countertop 17, on which the cleaning devices (11, 12, 13, 14) and the control device 16 are disposed. Further, a wash basin 171 is formed on the wash basin countertop 17. A supply port 133 of each cleaning device 13 is provided as facing the wash basin 171.

The sensing device 15 may be disposed on the wash basin countertop 17, or at a position close to the wash basin countertop 17. The sensing device 15 is a device implemented based on radio frequency identification (RFID), and has a sensing distance. For example, the sensing distance may be set as 1 cm or 0.5 cm. Before being implemented, the sensing device 15 is configured to react to only one predetermined identification tag 40, which has a unique code and may be further set to correspond to a user. Further, the identification tag 40 may be carried in a portable electronic device or in a physical card. Further, after the sensing device 15 is activated, a procedure activation signal 151 is generated once the sensing device 15 senses the approaching of the identification tag 40.

Figure 4:
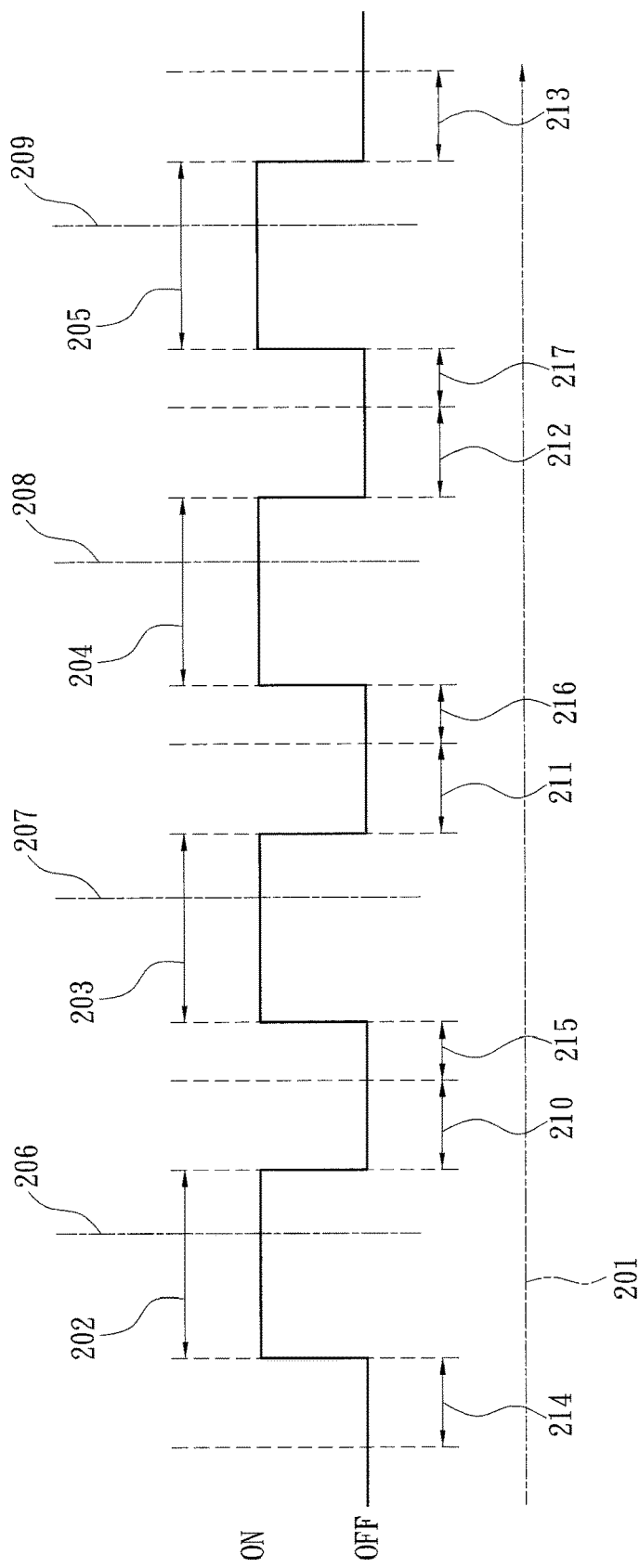
FIG. 4 is a waveform diagram of procedure control data according to an embodiment of the present invention.

The control device 16 may be a computer or a programmable logic controller (PLC), and at least includes a processing unit 18 and a memory unit 19. The control device 16 is electrically connected to each of the cleaning devices (11, 12, 13, 14) and the sensing device 15, and is set with procedure control data 20 that is stored in the memory unit 19. Referring to FIG. 4, in one embodiment, the procedure control data 20 includes activation sequence data 201 and a plurality of sets of operating time data (202, 203, 204, 205). The activation sequence data 201 defines an activation sequence of the cleaning devices (11, 12, 13, 14), and the activation sequence is scheduled according to a cleaning process. Further, a configuration sequence of the cleaning devices (11, 12, 13, 14) is also arranged according to the cleaning process. As such, in the embodiment, the sequence of implementation is the cleaning device 11 as a soap dispenser, the cleaning device 12 as a water faucet, the cleaning device 13 as a hand dryer and the cleaning device 14 as a disinfectant liquid dispenser. Each of the plurality of sets of operating time data (202, 203, 204 and 205) is set to correspond to one of the cleaning devices 11 (12, 13, 14). Each of the plurality of sets of operating time data 202 (203, 204, 205) defines a time length of a simulated activation signal 181 that the processing unit 18 outputs to each cleaning device 11 (12, 13, 14), and is set according to the corresponding cleaning service. Further, in the present invention, the procedure control data 20 further includes a plurality of minimum usage time conditions (206, 207, 208, 209) respectively defined on the basis of the plurality of sets of operating time data (202, 203, 204, 205). Each of the plurality of minimum usage time conditions 206 (207, 208, 209) defines a minimum time period of using each cleaning device 11 (12, 13, 14) during a timing process of each of the plurality of sets of operating time data 202 (203, 204, 205), and may be set according to a percentage of each of the plurality of sets of operating time data 202 (203, 204, 205). For example, the minimum usage time condition 206 is set according to 80% of the operating time data 202, such that the cleaning service performed on a user needs to reach above 80% of a predetermined time period.

Figure 5:
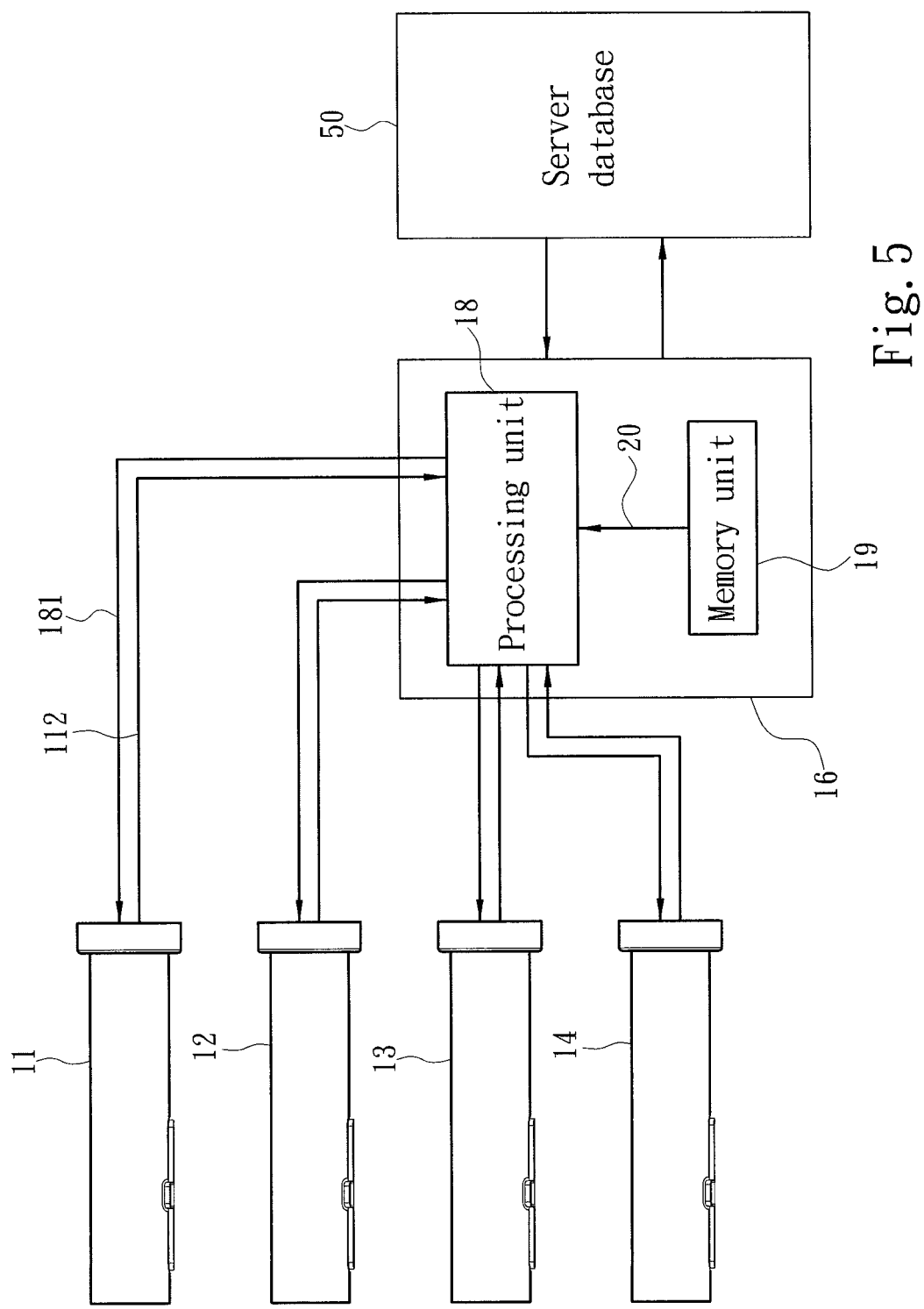
FIG. 5 is a schematic diagram of implementation according to an embodiment of the present invention.

The control device 16 has a first operation mode in which the control device 16 can cause each cleaning device 11 (12, 13, 14) to be activated independently, and a second operation mode in which the control device 16 temporarily controls the cleaning devices (11, 12, 13, 14) to operate upon acquiring the procedure activation signal 151. Referring to FIG. 1, the control device 16 is in the first operation mode for an extended period of time when the procedure activation signal 151 is not received, such that each cleaning device 11 (12, 13, 14) can be independently operated by a user and to be activated. Again referring to FIG. 1 and FIG. 5, when a user places the identification tag 40 thereof within the sensing distance of the sensing device 15 as needed, the sensing device 15 reacts and transmits the procedure activation signal 151 to the control device 16. The control device 16 enters the second operation mode upon acquiring the procedure activation signal 151. In the second operation mode, the control device 16 temporarily causes each cleaning device 11 (12, 13, 14) not to be controlled by the activation signal 112 (122, 132, 142); that is, the user at this point cannot arbitrarily activate any cleaning device 11 (12, 13, 14). The control device 16 causes, according to the procedure activation signal 151, the cleaning device 11 to be activated first to become activated and to dispense liquid soap to the user. Meanwhile, the detection element 111 of the cleaning device 11 senses the approaching hand and generates the activation signal 112. However, the activation signal 112 at this point is not for activating the cleaning device 11. The control device 16 receives the activation signal 112, times a time point at which the activation signal 112 appears, and compares a generation time of the activation signal 112 according to the minimum usage time condition 206, i.e., determining whether an actual usage time period of the user satisfies a goal. If it is determined that the minimum usage time condition 206 is not satisfied, the control device 16 re-activates the cleaning device 11 to request the user to again implement the corresponding cleaning service, and a next step is performed only when the minimum usage time condition 206 is satisfied. As such, a user is demanded to properly perform hand cleaning, thus improving the issue of a superficial request of the prior art. Further, when a user is requested to again implement the corresponding cleaning service, the user may be demanded to supplement the shortage to fulfill the minimum usage time condition 206. For example, when a user falls short from the minimum usage time condition 206 by 3 seconds, in the repeated implementation, the user is demanded to implement the same cleaning service for 3 supplementing seconds.

Again referring to FIG. 4, in one embodiment, the procedure control data 20 includes at least one set of waiting time data 210 (211, 212, 213) subsequent to one of the plurality of sets of operating time data 202 (203, 204, 205). In a time period defined by the waiting time data 210 (211, 212, 213), each cleaning device 11 (12, 13, 14) is not activated. The intention of the waiting time data 210 (211, 212, 213) is to provide a user with time for preparing cleaning of a next stage, e.g., rubbing liquid soap to produce foams during this period. In addition, in one embodiment, the procedure control data 20 includes at least one set of prompt time data 214 (215, 216, 217) before each of the plurality of sets of operating time data 202 (203, 204, 205). The control device 16 requests, according to the prompt time data 214, the cleaning device 11 to be activated to perform an operation prompt. The prompt time data 214 (215, 216, 217) also defines a time interval. Further, each cleaning device 13 may include a light emitting element 134, which may be a light emitting diode. In the time interval defined by the prompt time data 215, the control device 16 requests the light emitting element 134 of the cleaning device 13 to be activated to emit light, and means for emitting light may be flashing, emitting continuously or generating color changes, so as to remind a user of the currently performed hand washing procedure. Moreover, in one embodiment, the hand cleaning system 100 includes a display device 22 connected with the control device 16. The control device 16 outputs a plurality of sets of image data 161 to the display device 22 when the control device 16 reads the procedure control data 20, causing the display device 22 to perform display on the basis of each of the plurality of sets of image data 161. Further, each of the plurality of sets of image data 161 may be independently stored in the memory unit 19, and accessed in association with the procedure control data 20. Further, each of the plurality of sets of image data 161 displays a usage progress according to one of the plurality of sets of operating time data 202 (203, 204, 205) and the currently obtained activation signal 112 (122, 132, 142), and may be a progress percentage image.

In continuation, in one embodiment, the control device 16 in the second operation mode times the generation time of the activation signal 112 (122, 132, 142) to generate usage time data, generates estimated energy consumption data based on each of the plurality of sets of operating time data 202 (203, 204, 205), and generates actual energy consumption data based on the usage time data. More specifically, the energy consumption described in the present invention may refer to the use of liquid soap, the use of water, electric energy for activating a hand dryer and the use of disinfectant liquid.

The control device 16 may store energy consumption data of each cleaning device 11 (12, 13, 14) in the memory unit 19 in advance. The control device 16 calculates, based on the energy consumption data and each of the plurality of sets of operating time data 202 (203, 204, 205), the energy consumption of each cleaning device 11 (12, 13, 14) needed for the hand washing procedure, and integrates the energy consumption of each cleaning device 11 (12, 13, 14) to complete the estimated energy consumption data. Thus, the control device 16, in the second operation mode, further calculates, based on the usage time data and the energy consumption data of each cleaning device 11 (12, 13, 14), energy consumption generated by actually using each cleaning device 11 (12, 13, 14) during a hand washing procedure of a user to further integrate the same into the actual energy consumption data. The estimated energy consumption data and the actual energy consumption data may be stored in the memory unit 19 for a manager to access and to adjust the procedure control data 20 according to the estimated energy consumption data and the actual energy consumption data. As such, the hand washing procedure may be tuned to match an actual scenario, providing energy consumption management of the hand cleaning system 100 and preventing waste in resources.

In one embodiment, the control device 16 generates at least one set of user data completed based on the identification tag 40 and the usage time data. The user data is for representing a usage status of each user, is stored in the memory unit 19, and may be updated when a user activates the hand washing procedure by using the identification tag 40. Thus, a manager can access all user data to learn usage habits of each user and determine whether each user properly follows the hand washing procedure. Further, the user data may record, with respect to the hand washing procedure of each user, the number of times of failing the minimum usage time condition 206 (207, 208, 209).

Again referring to FIG. 1, in one embodiment, the hand cleaning system 100 includes a server database 50 informationally connected the control device 16. In this embodiment, the control device 16 has Internet connection capability; the server database 50 is not necessarily arranged at a peripheral of the control device 16 and may be, for example, a current cloud database, which shall not be further discussed herein. The server database 50 allows the control device 16 to connected thereto through the Internet to perform data exchange therewith. As such, the control device 16 may transmit all of the user data, the estimated energy consumption data and the actual energy consumption data to the server database 50, wherein the same data may be accessed from the server database 50 by a manager through Internet connection. Further, a manager may also transmit data to the control device 16 through the server database 50 to modify the procedure control data 20 of the control device 16. Moreover, when a same facility includes multiple number of the hand cleaning system 100, each hand cleaning system 100 has a unique identification number, allowing a manager to learn the usage of each hand cleaning system 100 or to control each hand cleaning system 100 according to the identification number.

What is claimed is:

1. A hand cleaning system, comprising:
    four cleaning devices, each of the four cleaning devices comprising a detection element, the detection element generating an activation signal after being operated, each of the four cleaning devices being activated in response to the activation signal and providing a cleaning service, the cleaning services respectively provided by the four cleaning devices being different, the four cleaning devices sequentially being a soap dispenser, a water faucet, a hand dryer and a disinfectant liquid dispenser;
    a sensing device, generating a procedure activation signal when an identification tag approaches; and
    a control device, connected to each of the four cleaning devices and the sensing device; the control device set with procedure control data, and sequentially controlling each of the four cleaning devices, and outputting a simulated activation signal to each of the four cleaning devices through operating time data; the operating time data set according to the corresponding cleaning service; the procedure control data further comprising a minimum usage time condition defined on the basis of the operating time data; the control device having a first operation mode, in which the control device causes each of the four cleaning devices to be activated independently, and a second operation mode, in which the control device reads the procedure control data upon acquiring the procedure activation signal and temporarily controls the four cleaning devices to operate; wherein, in the second operation mode, the control device receives the activation signal generated by each of the detection elements, compares a generation time of the activation signal according to the minimum usage time condition, and re-activates the four cleaning devices if the generation time of the activation signal does not satisfy the minimum usage time condition.

2. The hand cleaning system of claim 1, wherein the procedure control data comprises at least one set of waiting time data subsequent to the operating time data, and each of the four cleaning devices is not activated in a time interval defined by the waiting time data.

3. The hand cleaning system of claim 2, wherein the procedure control data comprises at least one set of prompt time data before each set of the operating time data, and the control device requests, according to prompt time data, one of the four cleaning devices to be activated to perform an operation prompt.

4. The hand cleaning system of claim 3, wherein the operation prompt is emitting light by a light emitting element of one of the four cleaning devices.

5. The hand cleaning system of claim 1, wherein when the control device is in the second operation mode, the generation time of the activation signal is timed to generate usage time data; the control device further generates estimated energy consumption data completed based on the operating time data, and actual energy consumption data completed based on the usage time data.

6. The hand cleaning system of claim 5, wherein the control device generates at least one set of user data based on the identification tag and the usage time data.

7. The hand cleaning system of claim 6, further comprising a server database informationally connected with the control device.

8. The hand cleaning system of claim 1, further comprising a wash basin countertop for disposing the four cleaning devices and the control device; wherein, a wash basin is formed on the wash basin countertop, and the wash basin faces a supply port of each of the four cleaning devices.

9. The hand cleaning system of claim 1, further comprising a display device connected with the control device; wherein, the control device outputs a plurality of sets of image data to the display device when the control device reads the procedure control data to cause the display device to perform display according to each of the sets of image data.

* * * * *